United States Patent Office 3,183,253
Patented May 11, 1965

3,183,253
(OPTIONALLY 17-ALKYLATED) ANDROST-3-ENE-5β,17β-DIOLS AND ESTERS THEREOF
Paul D. Klimstra, Northbrook, Ill., assignor to G. D. Searle & Co., Chicago, Ill., a corporation of Delaware
No Drawing. Filed Aug. 23, 1963, Ser. No. 304,247
6 Claims. (Cl. 260—397.5)

The invention herein described is concerned with novel 5-hydroxy steroids of the androstane series and especially with the (optionally 17-alkylated) androst-3-ene-5β,17β-diols and esters derived therefrom, said compounds represented by the structural formula

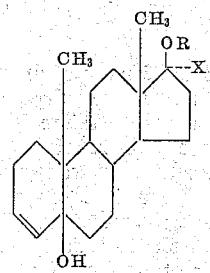

wherein R can be hydrogen or a

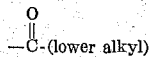
—C—(lower alkyl)

radical, and X is symbolic of hydrogen or a lower alkyl radical.

The lower alkyl radicals encompassed in the foregoing structural representation are those within the scope of the formula

$C_nH_{2n+1}$ wherein n is a positive integer less than 8, and are exemplified by methyl, ethyl, isopropyl, secondary-butyl, tertiary-pentyl, hexyl, and heptyl.

A process suitable for the manufacture of the compounds of the present invention involves the utilization of starting materials of the structural formula

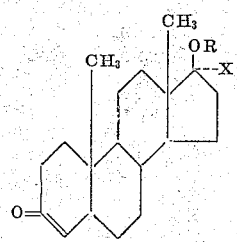

wherein R is hydrogen or a

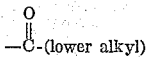
—C—(lower alkyl)

radical, and X can be hydrogen or a lower alkyl radical. Epoxidation of those materials, typically with alkaline hydrogen peroxide, affords the corresponding 4β,5β-epoxy derivatives, containing a trace of the 4α,5α-epoxy isomer. The reaction of 17β-hydroxyandrost-4-en-3-one, for example, with aqueous hydrogen peroxide and methanol results in 4β,5β-epoxy-17β-hydroxyandrostan-3-one. Those epoxy intermediates are transformed into the 5β-hydroxy-Δ³ compounds of the present invention by a process which involves heating with hydrazine hydrate at the reflux temperature for a relatively short period of time. The aforementioned 4β,5β-epoxy-17β-hydroxyandrostan-3-one, typically, is heated with hydrazine hydrate, and the resulting product is isolated to yield androst-3-ene-5β,17β-diol.

An alternate method for the preparation of esters of the instant compounds containing a secondary hydroxy group at the 17-position involves the acylation of those 17β-ols with a lower alkanoic acid anhydride or halide in the presence of a suitable acid acceptor. Androst-3-ene-5β,17β-diol is contacted with acetic anhydride and pyridine, for example, at room temperature to produce androst-3-ene-5β,17β-diol 17-acetate.

The novel compounds of this invention are characterized by valuable pharmacological properties. They display hormonal activity, for example, as is evidenced by their ability to evoke anabolic and androgenic responses.

The following examples illustrate in further detail some of the compounds which constitute this invention together with methods for their preparation. The invention, however, is not to be construed as limited thereby either in spirit or in scope as many modifications both in materials and methods can be adapted without departing from the invention herein described. In these examples, temperatures are indicated in degrees centigrade (° C.) and quantities of materials in parts by weight unless otherwise noted.

Example 1

To a solution of 20 parts of 17β-hydroxyandrost-4-en-3-one in 480 parts of cold methanol is added successively 132 parts of cold 30% aqueous hydrogen peroxide and 40 parts by volume of cold 10% aqueous sodium hydroxide. The resulting reaction mixture is kept at about 3° for about 2 days, then is poured carefully into water. That aqueous mixture is extracted several times with methylene chloride, and the organic layer is separated, washed successively with water, 10% aqueous sodium carbonate, and water, then is dried over anhydrous potassium carbonate. Removal of the solvent by distillation at reduced pressure affords an oil which solidifies on standing. Recrystallization of that solid material from acetone-hexane results in 4β,5β-epoxy-17β-hydroxyandrostan-3-one, melting at about 156–158° and characterized further by an optical rotation of +137.5° in chloroform.

Example 2

To a solution of 30 parts of 17β-hydroxy-17α-methylandrost-4-en-3-one in 720 parts of methanol is added successively 198 parts of cold 30% aqueous hydrogen peroxide and 60 parts by volume of cold 10% aqueous sodium hydroxide. After standing at about 3° for about 2 days, that reaction mixture is filtered to remove a small amount of insoluble material, then is poured carefully into a mixture of ice and water. The gummy precipitate which forms is collected by filtration and extracted into methylene chloride. The aqueous phase is extracted several times with methylene chloride, and the combined methylene chloride solutions are washed with water, then dried over anhydrous potassium carbonate. That solution is stripped of solvent by distillation at reduced pressure to afford 4β,5β-epoxy-17β-hydroxy-17α-methylandrostan-3-one as an oil. This compound displays infrared absorption maxima at about 2.75, 3.4, and 5.83 microns.

Example 3

By substituting 31.4 parts of 17α-ethyl-17β-hydroxyandrost-4-en-3-one and otherwise proceeding according to the processes described in Example 2, 4β,5β-epoxy-17α-ethyl-17β-hydroxyandrostan-3-one is obtained.

Example 4

The substitution of 34.2 parts of 17β-acetoxy-17α-methylandrost-4-en-3-one in the procedure described in Example 2 results in 17β-acetoxy-4β,5β-epoxy-17α-methylandrostan-3-one.

Example 5

A mixture of 2 parts of 4β,5β-epoxy-17β-hydroxyandrostan-3-one and 30.9 parts of 100% hydrazine hydrate is heated at about 90° for about 10 minutes, during which time the mixture gradually becomes homogeneous. Heating of this deep yellow solution is continued at the reflux temperature for about 15 minutes, after which time the reaction mixture is cooled and diluted with about 30 parts of water. Further cooling of this aqueous mixture results in precipitation of a solid which is extracted into a 2:1 ether-methanol solution. That organic solution is washed twice with water, then is dried over anhydrous potassium carbonate containing decolorizing carbon. Removal of the solvent by distillation at reduced pressure results in a gummy residue, which is recrystallized from aqueous methanol to afford a hydrate of androst-3-ene-5β,17β-diol, melting at about 100°. Drying of that hydrate affords the anhydrous compound as a glass. That compound is represented by the structural formula

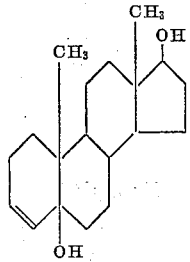

*Example 6*

A mixture of 28 parts of 4β,5β-epoxy-17β-hydroxy-17α-methylandrostan-3-one and 257.5 parts of 100% hydrazine hydrate is heated at the reflux temperature for about 30 minutes. The reaction mixture initially becomes homogeneous, but an oil settles out during the heating period. The upper layer is decanted into water, resulting in precipitation of the crude product. This solid is collected by filtration and washed with water, then dried to afford 17α-methylandrost3-ene-5β,17β-diol.

The oily layer is dissolved in methanol, and this organic solution is poured into a mixture of ice and water. The precipitate which forms is collected by filtration, washed on the filter with water, then recrystallized from aqueous methanol to yield an additional quantity of 17α-methylandrost-3-ene-5β,17β-diol, melting at about 163–165°. It is represented by the structural formula

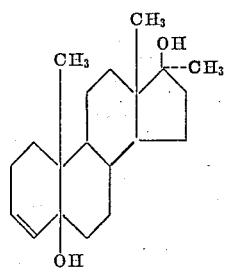

*Example 7*

The reaction of 29.2 parts of 4β,5β-epoxy-17α-ethyl-17β-hydroxyandrostan-3-one with hydrazine hydrate by the procedure described in Example 6 results in 17α-ethylandrost-3-ene-5β,17β-diol of the structural formula

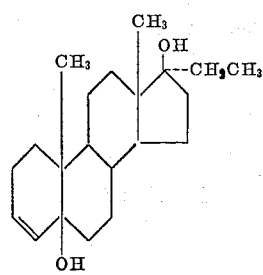

*Example 8*

The substitution of 31.7 parts of 17β-acetoxy-4β,5β-epoxy-17α-methylandrostan-3-one in the procedure of Example 6 results in 17α-methylandrost-3-ene-5β,17β-diol 17-acetate, represented by the structural formula

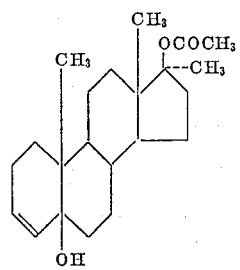

*Example 9*

A solution containing 3 parts of androst-3-ene-5β,17β-diol, 30 parts of pyridine, and 15 parts of acetic anhydride is stored at room temperature for about 16 hours, then is poured into a mixture of ice and water. The oily layer which initially separates is converted to a solid upon stirring, and that solid is collected by filtration, washed on the filter with water, and dried in air. Recrystallization of that crude product from aqueous methanol affords pure androst-3-ene-5β,17β-diol 17-acetate, melting at about 121–124°. It can be represented by the structural formula

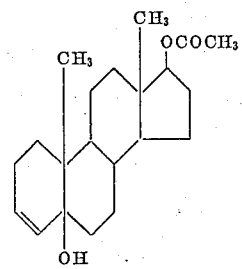

*Example 10*

By substituting 19.1 parts of propionic anhydride and otherwise proceeding according to the processes described in Example 9, androst-3-ene-5β,17β-diol 17-propionate of the structural formula

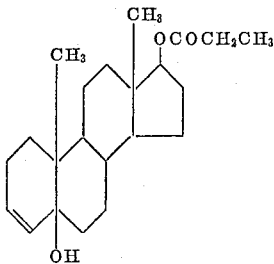

is obtained.

What is claimed is:
1. A compound of the formula

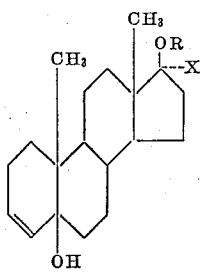

wherein R is a member of the class consisting of hydrogen and

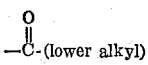

radicals, and X is selected from the group consisting of hydrogen and lower alkyl radicals.

2. Androst-3-ene-5β,17β-diol.
3. A compound of the formula

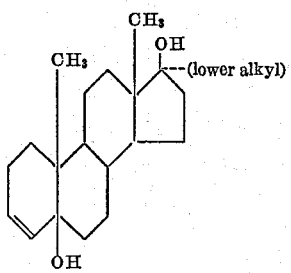

4. 17α-methylandrost-3-ene-5β,17β-diol.

5. A compound of the formula

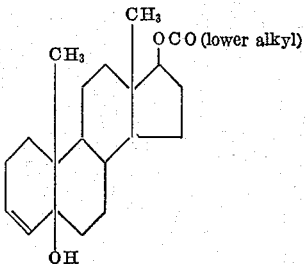

6. Androst-3-ene-5β,17β-diol 17-acetate.

References Cited by the Examiner
UNITED STATES PATENTS
3,020,296   2/62   Nomine et al. _____ 260—397.45

OTHER REFERENCES

McKenna et al.: "Chem. Soc., J." (London), 1959, pp. 2504–2509.

LEWIS GOTTS, *Primary Examiner.*

UNITED STATES PATENT OFFICE
CERTIFICATE OF CORRECTION

Patent No. 3,183,253                          May 11, 1965

Paul D. Klimstra

It is hereby certified that error appears in the above numbered patent requiring correction and that the said Letters Patent should read as corrected below.

Column 1, lines 42 to 52, the formula should appear as shown below instead of as in the patent:

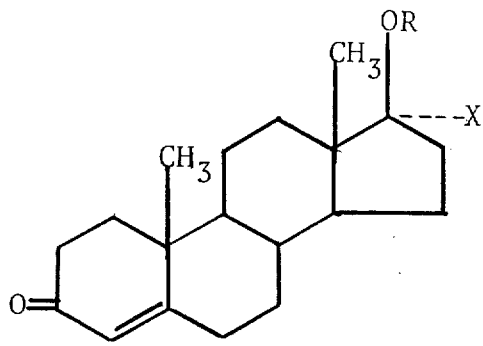

column 3, line 38, for "-methylandrost3-ene-" read -- -methyl-androst-3-ene- --.

Signed and sealed this 28th day of June 1966.

(SEAL)
Attest:

ERNEST W. SWIDER
Attesting Officer

EDWARD J. BRENNER
                                          Commissioner of Patents